(No Model.) 2 Sheets—Sheet 1.

F. A. STEVENS.
CAR COUPLING.

No. 508,779. Patented Nov. 14, 1893.

Witnesses,

Inventor,
Fred A. Stevens
By Dewey & Co.
attys (No Model.) 2 Sheets—Sheet 2.

F. A. STEVENS.
CAR COUPLING.

No. 508,779. Patented Nov. 14, 1893.

Witnesses,

Inventor,
Fred A. Stevens
By Dewey & Co
Attys

UNITED STATES PATENT OFFICE.

FRED A. STEVENS, OF SACRAMENTO, CALIFORNIA.

CAR-COUPLING.

SPECIFICATION forming part of Letters Patent No. 508,779, dated November 14, 1893.

Application filed April 28, 1893. Serial No. 472,224. (No model.)

*To all whom it may concern:*

Be it known that I, FRED A. STEVENS, a citizen of the United States, residing at Sacramento, Sacramento county, State of California, have invented an Improvement in Car-Couplings; and I hereby declare the following to be a full, clear, and exact description of the same.

My invention relates to a coupling for cars. It consists in certain details of construction which will be more fully explained by reference to the accompanying drawings, in which—

Figure 1:
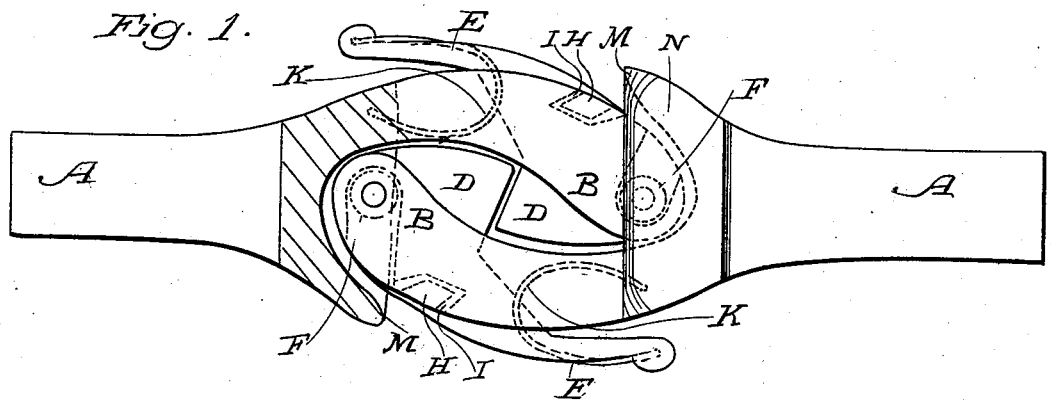
Figure 2:
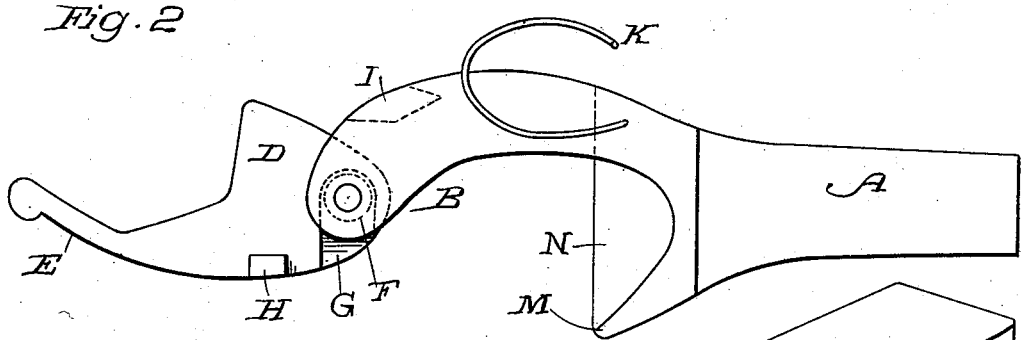
Figure 3:
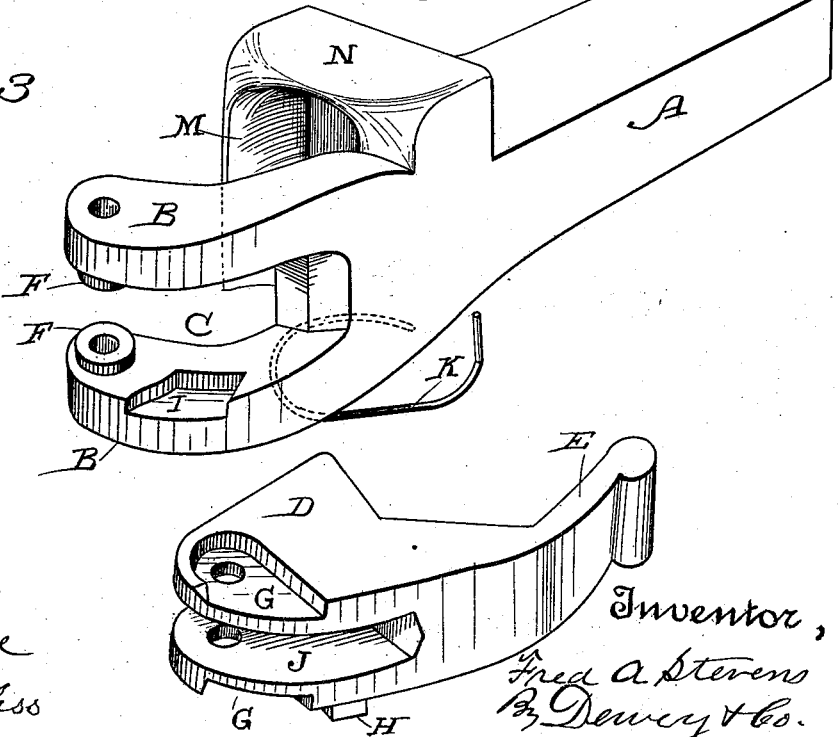
Figure 4:
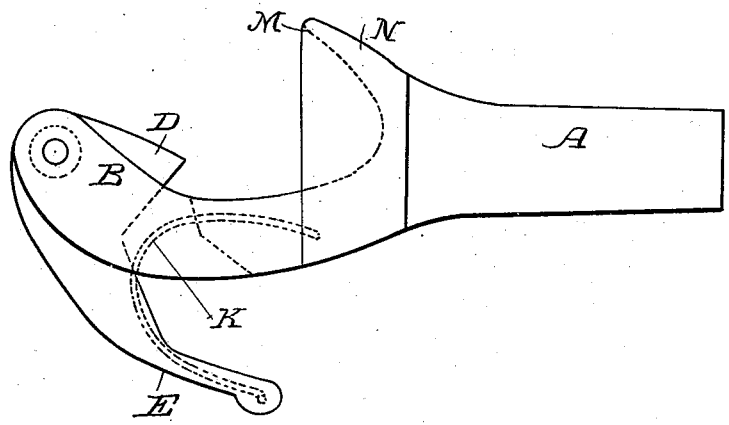
Figure 5:
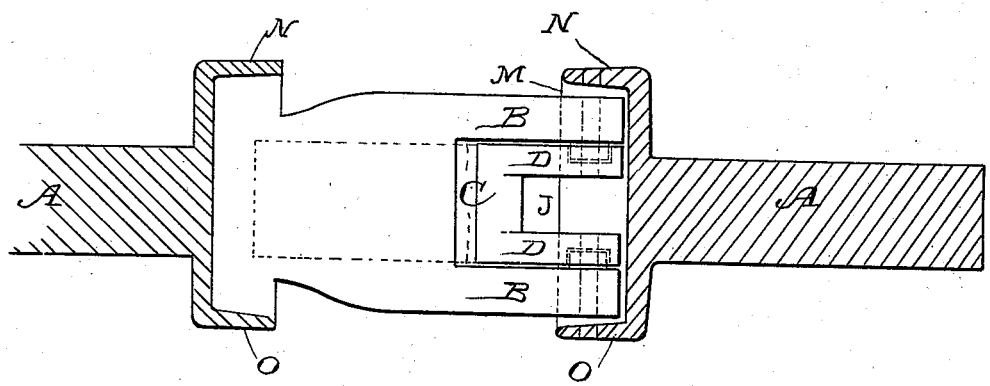

Figure 1 is a plan view of my coupling. Fig. 2 is a bottom view of one of the parts, showing the hook in position to disengage. Fig. 3 shows the draw-bar and head, with the hook removed. Fig. 4 shows the hook disengaged. Fig. 5 is a vertical section showing the hood or stop.

The object of my invention is to provide an automatic coupling, in which the parts of the coupling are prevented from separating accidentally, the draft, when the two parts of the coupling are engaged, is in a direct line, with a tendency to hold the parts of the coupling closed together, and each coupling comprises but three pieces which are ready to be put together without any tool work or finishing.

A is the shank of the draw-bar having the curved head or extension B projecting from the end at one side of the center, with the outer end curved toward the center line, and chambered as shown at C for the reception of the movable interlocking hook D which is formed with an exterior projecting arm E.

The chambered portion of the part B has two short cylindrical lugs F projecting toward each other from the upper and lower portion respectively as shown, and the interlocking hook D is formed with corresponding depressions G upon the top and bottom, these depressions having a closed rim around the inner side, but left open upon the outside or back, so that when the hook is reversed in position with relation to the end B, these depressed openings may be slipped over the projecting lugs F, and the hook then rotated about the lugs as a center, until the hook portion projects interior to the arm B, while the arm E, by which the hook is disengaged, projects outside of the arm B as shown.

Upon the rear of the hook D is formed a lug H and a corresponding depression I is made in the back of the arm B so that this lug will project into the depressions when the hook D is in proper position, and will form a stop to prevent its slipping inwardly with relation to the arm B, while the closed rims of the depressions G at top and bottom, and the lugs F retain it in proper position with relation to the arm and form the pivot about which the hook turns to couple or uncouple.

In order to provide for the use of the ordinary link when this coupling is opposed to a car having a coupling equipped with the link, the end of the hook portion has the horizontal channel J made through it to admit the link from the opposite car, and both this part and the upper and lower part of the arm B have holes cored through them which stand in line when the parts are put together for the reception of the usual coupling pin.

In order to retain the hook D in its proper position, I employ a spring K which is fixed to the arm B, as shown at one end, while the opposite end connects with the outer arm E of the coupling hook. The tension of the spring is such as to normally keep this outer arm E closed against the back or outer side of the arm B, thus holding the hook normally in position to engage with the corresponding hook of the opposing car. The elasticity of the spring is such that when the points of two hooks pass each other, the spring will yield to allow the hook portions to pass, and the couplings to engage, after which the springs throw the hooks back into the proper position and retain them there until forcibly disengaged. The outer curved end of each of the arms B strikes a corresponding projecting lip M upon the opposite coupling, just previous to the interlocking of the hooks and this throws these two curved arms B toward the center, as the hooks pass each other and become engaged, and the draft will be on a central line through the draw-bars A.

From the peculiar position of the parts with relation to each other, it will be seen that any tendency of the couplings to pull away from each other, when turning curves, will be resisted and the bevel of the hooks will tend to draw the two more closely together as the strain upon them is increased, when pulling in a straight line. When passing over a rough road, or a road which gives considerable vertical vibration, great difficulty has been encountered with this class of couplings, on account of the tendency of one of the couplings to lift above the other, and thus disengage altogether.

In my invention I have formed each of the couplings with a hood or extension N over the top, or a corresponding extension O at the bottom, so that when the heads B have passed inside of the guiding lip M, they will engage the hood, or the extension, as the case may be, so as to prevent their being lifted above or dropped below the other coupling so far as to entirely disengage. There is, however, sufficient play to allow all necessary vertical movement of the couplings. This extension may be formed as a part of the coupler as shown, or it may be an extension of the platform, or deadwood from the car. Another advantage of this hood or extension, when found upon the coupler itself, is that it will hold the coupling and draw-bar up and prevent its falling to the ground where it is liable to produce accident if it should be pulled out of the car.

When the couplings are to be disengaged, it is only necessary to pull one of the outwardly projecting arms E of the coupling hooks to one side until the hook is disengaged from its fellow. As soon as released, the spring acts to throw the hook back into its proper position, and it is thus always in readiness to make a coupling when another car is brought in contact with it.

Having thus described my invention, what I claim as new, and desire to secure by Letters Patent, is—

1. A car coupling comprising the extension head of the draw bar having a horizontal chamber with inwardly projecting lugs, and a coupling link having slotted chambers for the reception of said lugs whereby the link is retained in position, said link having an outwardly extending arm adapted to project beyond the plane of the side of the extension head, substantially as herein described.

2. In a car coupling, the draw-bar having the extension B horizontally chambered, with inwardly projecting cylindrical lugs from the top and bottom of the chamber, a coupling hook having an extension adapted to pass outside of the head B and the hook portion inside thereof, slotted chambers formed upon the top and bottom of the hook and adapted to engage the lugs in the chamber of the head B whereby the coupling hook is retained in position, substantially as herein described.

3. In a car coupling, the draw-bar having the extension B, chambered to receive the coupling hook and having the lugs projecting upwardly and downwardly within the chamber, an inwardly projecting coupling hook having grooves or channels formed on the top and bottom adapted to engage the lugs of the chamber and an arm lying exterior to the extension B, and a spring whereby the arm is normally pressed against the exterior of the draw-head and the hook held in position to couple, substantially as herein described.

4. In a car coupling, the draw-head having the inwardly curved chambered extension B, a coupling hook having an arm extending outside of the draw-head, and the hook interior thereto, and a means for fulcruming it in the chamber of the draw-head, a spring by which the hook is normally held in position to couple with an opposing hook, a lip by which the inwardly curved end of the opposing draw-head is forced inwardly when the two meet, and a hood or extension whereby the head is prevented from moving up or down with relation to the opposing one so as to disengage, substantially as herein described.

In witness whereof I have hereunto set my hand.

FRED A. STEVENS.

Witnesses:
S. H. NOURSE,
H. F. ASCHECK.